April 28, 1970 E. H. WEBER, JR 3,509,291

METHOD AND APPARATUS TO ADJUST THE CAPACITANCE OF A NETWORK TO SOME PREDETERMINED VALUE

Filed Nov. 14, 1967

INVENTOR
E. H. WEBER, JR.
BY Alfred G. Steinmetz
ATTORNEY

United States Patent Office 3,509,291

Patented Apr. 28, 1970

3,509,291

METHOD AND APPARATUS TO ADJUST THE CAPACITANCE OF A NETWORK TO SOME PREDETERMINED VALUE

Edward H. Weber, Jr., Madison Township, Middlesex County, N.J., assignor to Bell Telephone Laboratories, Incorporated, Murray Hill, N.J., a corporation of New York Filed Nov. 14, 1967, Ser. No. 682,888

Int. Cl. H04b *3/46*

U.S. Cl. 179—175.31 8 Claims

ABSTRACT OF THE DISCLOSURE

An impedance adjustment scheme to preset an artificial cable capacitance is embodied in an adjustment apparatus comprising a plurality of parallel variable impedance ratio branch arms. In the first of these branch arms an adjustable resistor in series with a capacitor is utilized to preset a resistive-reactive impedance ratio referenced in terms of the capacitance of the artificial cable to be preset. This resistive-reactive impedance ratio is reproduced by varying the reactive impedances in the remaining branch arms in which the artificial cable capacitor to be preset is included.

FIELD OF THE INVENTION

Figure 1:
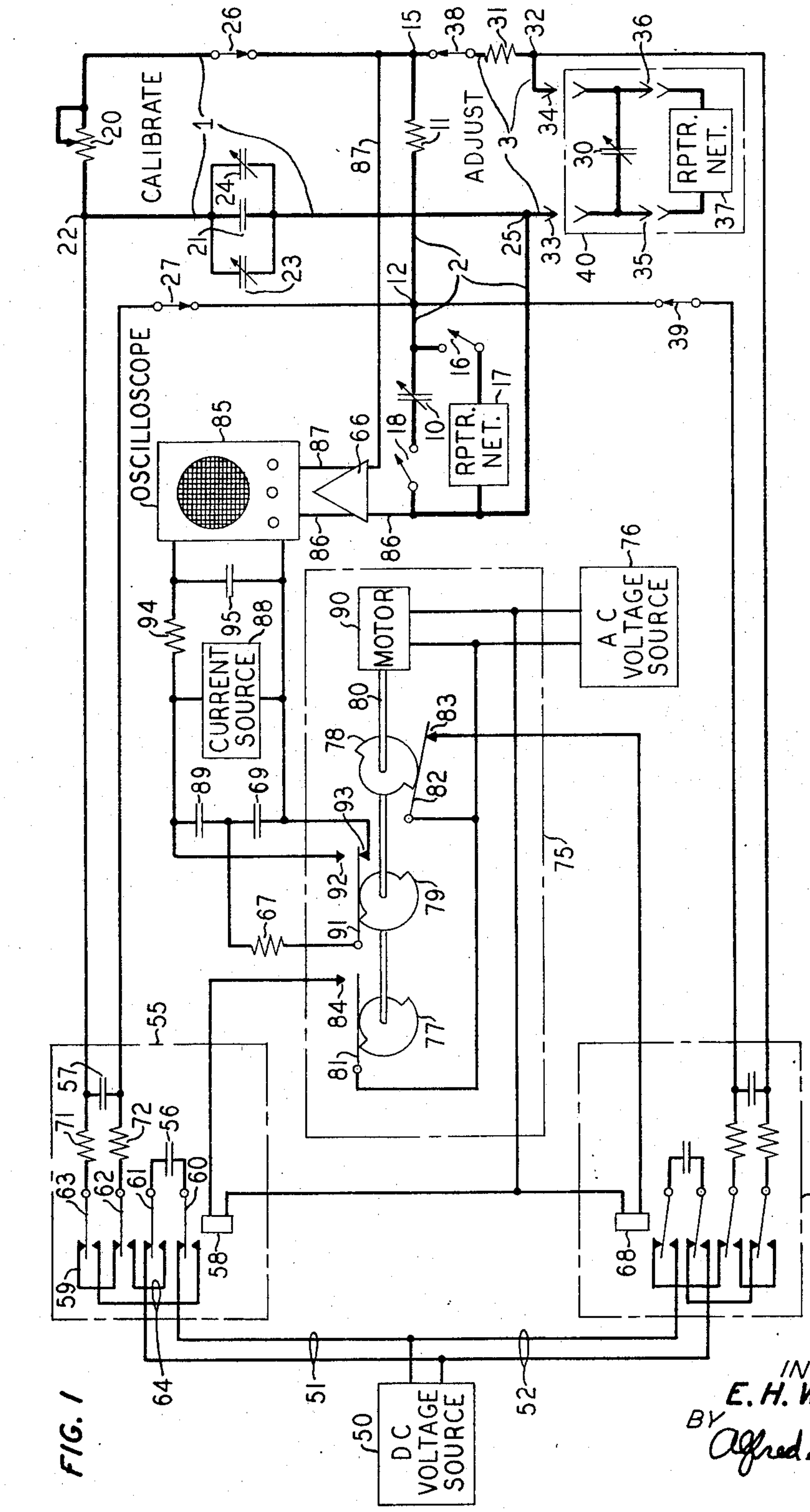

This invention relates to an impedance adjustment method and apparatus to facilitate the adjustment of the capacitance of artificial cable sections to match the corresponding distributed capacitance of a submarine telephone cable section under predetermined specific environmental conditions.

BACKGROUND OF THE INVENTION

Alternating current bridge methods are utilized to locate faults in submarine telephone cables. A fault in a submarine cable is located by utilizing an alternating current bridge to match the impedance of the faulted submarine cable with the impedance of an artificial cable adjusted to some equivalent cable length. The equivalent length of the artificial cable is adjusted by means of a switching network which permits a simulated fault to be inserted at any equivalent location in the artificial cable. The location of the fault in the submarine cable is determined by the equivalent location of the simulated fault at which the impedance of the artificial cable matches the impedance of the faulted submarine cable.

The accuracy of the fault location is dependent upon the accuracy with which the impedance of the artificial cable matches the actual distributed impedance of the submarine cable and its included repeaters. The artificial cable comprises a series of networks including capacitors, inductors, and resistors which simulate the distributed impedances of the submarine cable at certain frequencies. Special networks are included in the artificial cable to simulate the repeaters. The resistors, inductors, and capacitors of each artificial cable network must be adjusted (or preset) to match the correspondingly distributed impedances of specific sections of the submarine cable which are exposed to various depths and temperatures. An artificial cable suitable for fault location operations is disclosed, for instance, in my article "Cable Fault Localization Test Sets" in the Bell Laboratories Record, vol. 42, 1964, pp. 289–293.

The submarine cable transmission path and its included repeaters significantly attenuate the impedance comparison test signals of the alternating current bridge. This attenuation increases rapidly with an increase in the test signal frequency. Hence to locate faults very accurately, it is necessary to perform the fault location tests at a very low frequency (approximately 1 Hz.) to minimize the attenuation of the test signal. This low test signal frequency introduces difficulty in the presetting of the capacitors of the artificial cable to a specified capacitance value. This difficulty is due to the necessary balancing of the test signal source and the capacitance adjustment network with respect to ground.

The artificial cable includes simulated repeaters. The standard repeaters included in the submarine cable transmission path include electrical components such as castor oil dielectric capacitors, which have impedance characteristics differing from those of typical air dielectric capacitors. Hence the simulated repeaters used in the fault location test are relatively complex in order to approximate these signal impedance characteristics at the test signal frequencies used. Due to this complexity, any impedance adjustment of the capacitance of the simulated repeaters by bridge techniques is necessarily limited to a very narrow range of impedance. The adjustment of the simulated repeater capacitance of the artificial cable is performed within this narrow range indepently of the adjustment to match the distributed capacitance of the submarine cable.

The capacitance of the articifical cable is most readily preadjusted by comparing it with an accurate preset calibrated capacitor. However, the accuracy of calibrated capacitors, such as are normally included in a capacitance decade box arrangement, is not sufficient to attain the required precision in adjusting the capacitance of the artificial cable. Additionally, the capacitance of capacitors tends to change with the passage of time. Hence, a capacitor, initially having the desired accuracy, may change to another capacitance value. The capacitance accuracy may be improved by the special manufacture of very high precision calibrated capacitors, but this is generally not economically feasible.

It is therefore an object of the present invention to adjust the capacitance of an artificial cable to an accurate preset value without the necessity for a high precision adjustable calibrated capacitor on which to base this adjustment.

It is another object of the invention to energize an impedance adjustment apparatus to adjust the capacitance of an artificial cable without a direct interconnection with the energizing source hence rendering a balance to ground between the impedance adjustment apparatus and the energizing source unnecessary.

It is yet another object of the invention to translate a precision impedance value of a resistance medium into a capacitance impedance value of corresponding precision.

SUMMARY OF THE INVENTION

Therefore, in accordance with the present invention an impedance adjustment scheme is utilized to adjust the capacitance of an artificial cable to some predetermined capacitance value by an indirect adjustment procedure which does not utilize a precision calibrated adjustable capacitor as the initial calibration setting. The procedure instead utilizes a resistive-reactive impedance ratio established with a fixed precision capacitor and an adjustable resistor as the initial calibration setting.

An impedance adjustment apparatus in accordance with the adjustment scheme comprises a calibration network to preset an adjustable comparison capacitor; and an adjustament network in which the artificial cable capacitance is subsequently adjusted to match the capacitance of this preset adjustable comparison capacitor.

The adjustable comparison capacitor is connected in a branch arm, common to the adjacently connected calibration and adjustment networks. A precision calibrated adjustable resistor is connected in series with a precision reference capacitor in a first branch arm included in the calibration network. This adjustable resistor is calibrated in terms of a capacitance value referenced in terms of submarine cable length. The adjustable resistor is adjusted to set up a resistive-reactive impedance ratio to permit the setting of the capacitance of the artificial cable network to a specific value. The adjustable comparison capacitor is connected in series with a precision fixed resistor in the common branch arm. This comparison capacitor is adjusted to achieve the same resistive-reactive impedance ratio in the common branch arm as has been established in the first branch arm of the calibration network.

The artificial cable capacitance to be adjusted is inserted in a third branch arm which is included in the adjustment network. It is connected in series with a fixed precision resistor equalling the aforementioned fixed precision resistor. The capacitance of the artificial cable is adjusted therein until a resistive-reactive impedance ratio is achieved in the third branch arm equalling the resistive-reactive impedance ratio of the first and common branch arms.

A feature of the invention is the use of storage capacitors to transfer electrical energy from a voltage source to the impedance adjustment apparatus without the need for a direct electrical interconnection therebetween. Hence it is unnecessary to balance the source and the adjustment apparatus with respect to ground.

Another feature of the invention is the simultaneous monitoring of the impedance ratio in all three branch arms to detect any inadvertent readjustments of impedance ratios during the adjustment procedure.

Yet another feature of the invention permits the incorporation of simulated repeaters in the branch arms of the adjustment network. Inclusion of simulated repeaters in the adjustment network permits a fine precision adjustment of the total capacitance of the artificial cable and the included simulated repeaters.

Still another feature of the invention is the calibration of adjustable impedance elements in the impedance adjustment apparatus in terms of the environmental conditions of a submarine cable such as depth and temperature.

DRAWINGS

Figure 2:
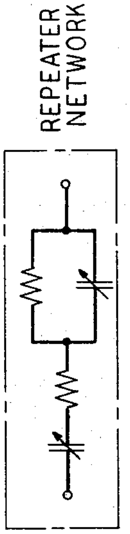

These and other objects and features of the invention and its various advantages will appear more fully upon consideration of the attached drawings and the following detailed description of the drawings wherein:

FIG. 1 is a schematic circuit diagram of an impedance adjustment apparatus embodying the principles of the invention; and FIG. 2 is a schematic circuit diagram of a typical simulated repeater capacitance such as is used in an artificial cable in fault location operations.

DETAILED DESCRIPTION

FIG. 1 shows an impedance adjustment apparatus constructed in accordance with the present invention. The impedance adjustment apparatus comprises three branch arms 1, 2, and 3 including resistive-reactive impedances and connected in parallel to the nodal points 15 and 25. The three branch arms 1, 2, and 3 are utilized to form a calibration network including the branch arms 1 and 2 and an adjustment network including the branch arms 2 and 3. The calibration network and the adjustment network each share one of the branch arms 2 in common. The initial adjustment of the artificial cable network must be related to the length, depth, and temperature of the submarine cable section involved. The calibration network includes the first branch arm 1 with an adjustable resistor 20 and a fixed precision capacitor 21 shunted by two auxiliary adjustable capacitors 23 and 24. The adjustable resistor 20 may comprise a resistive decade box including a plurality of highly accurate wire wound resistors. The adjustable resistor 20 is calibrated in terms of submarine cable length. The auxiliary adjustable capacitors 23 and 24 are calibrated in terms of submarine cable depth and temperature. The adjustable resistor 20 and the auxiliary adjustable capacitors 23 and 24 are preset to some value to arrange in the first branch arm 1 a resistive-reactive impedance ratio which is referenced to the impedance of a submarine cable section of a particular length, located at a particular depth, and exposed to a particular temperature.

The branch arm 2 which is common to the calibration and adjustment networks includes an adjustable capacitor 10 connected to a fixed precision resistor 11. The adjustable capacitor 10 may comprise a capacitive decade box. The adjustable capacitor 10 and the precision resistor 11 are positioned electrically opposite the capacitor 21 and the adjustable resistor 20, respectively.

The calibration and adjustment networks are energized, as described below, by energizing signals generated in phase quadrature or 90° out of phase with each other. The two energizing signals separated in phase by 90° are derived from a voltage source 50 and are applied, via the energy transfer circuits 55 and 65, to the nodal points 12 and 22 and the nodal points 12 and 32 connected to the calibration and adjustment networks, respectively. The impedance ratios established in each of the three branch arms 1, 2, and 3 are monitored by an oscilloscope 85 connected to the calibration and adjustment networks at the nodal points 15 and 25. The oscilloscope displays the signal traces due to the signal response of the calibration and adjustment networks due to the energizing signals applied thereto.

The adjustment network is initially de-energized for the purpose of adjusting the impedance ratio of the common branch arm 2 to that of the first branch arm 1. The adjustment network is de-energized by opening the switches 38 and 39. The adjustable capacitor 10 is adjusted until the resistive-reactive impedance ratio in the common branch arm 2 is identical to that established in the first branch arm 1.

The common branch arm 2 and a third branch arm 3, interconnecting the nodal points 15 and 25, form an adjustment network in which a capacitor 30 of an artificial cable section 40 is connected to the third branch arm 3, for the purpose of adjusting it to some predetermined value. The capacitor 30 is one of the many capacitors included in the artificial cable. Each section 40 of the artificial cable has an independent group of adjustable capacitors which are adjusted to match the capacitance of a corresponding submarine cable section.

The third branch arm 3 includes a precision resistor 31 which is identical in resistance to the precision resistor 11 in the common branch arm 2. The adjustment network is re-energized by closing the switches 38 and 39. The capacitor 30 of the artificial cable section is adjusted in capacitance until the resistive-reactive impedance ratio within the third branch arm 3 is identical to the ratio established within the first and common branch arms 1 and 2. The apparatus utilized to energize the calibration and adjustment network and measure the impedance ratio balance of the branch arms 1, 2, and 3 will be described subsequently.

The two-step adjustment method, described above, predicates the artificial cable capacitance adjustment on a precision resistance adjustment made in the first branch arm 1. The fixed capacitor 21 in the first branch arm 1 has some precise capacitance value related to an arbitrarily selected submarine cable section length at a reference depth and temperature value. The parallel auxiliary adjustable capacitors 23 and 24 are adjusted to compensate for variations of the cable from the reference depth and temperature, respectively. The depth and temperature conditions of the submarine cable cause only slight variations in its distributed capacitance and hence, to simplify adjustment, the capacitance introduced by the capacitors 23 and 24 is adjustable only to specified quantum levels of depth and temperature. The adjustable capacitors 23 and 24 each preferably comprise a capacitance decade box arrangement including a plurality of precision fixed capacitors representing each quantum level of depth and temperature. The adjustable capacitor 10 and the artificial cable capacitor 30 are subsequently adjusted, as described above, to match the capacitance of a submarine cable section of equivalent length and at an equivalent depth and temperature.

In order to approximate the signal transmission characteristics of the submarine cable accurately, the artificial cable must include networks to simulate the effects on signal transmission introduced by the repeaters, which are inserted at periodic intervals along the submarine cable. These repeaters are complex networks including complex electrical devices, such as castor oil dielectric capacitors which have unusual impedance characteristics. Hence the reference simulated repeaters 17 and 37 included in the adjustment network and artificial cable 40, respectively, are relatively complex. A typical circuit utilized to simulate the low frequency capacitive characteristics of repeaters is shown in FIG. 2. Because of this complexity, it is not practical to adjust the simulated repeater 37 by the two-step technique used to adjust the capacitor 30. Hence the calibration network is not utilized during this adjustment.

To adjust the simulated repeater 37 included in the artificial cable 40, the reference simulated repeated 17 is shunted across the adjustable capacitor 10 by closing the switch 16. The simulated repeater 37 is plugged into the receptacles 35 and 36 to shunt the adjustable capacitor 30. This connection simulates the effect of the repeater on the distributed capacitance of the submarine cable. The calibration network is disconnected from the impedance adjustment apparatus by opening the switches 26 and 27. This disconnection is necessary because, with all three branch arms energized, the instrumentation, as described below, will only indicate a resistive-reactive impedance ratio balance existing simultaneously in all three branch arms.

The capacitors of the reference simulated repeater 17, as indicated in FIG. 2, may be adjusted within a small range to adjust the resistive-reactive impedance ratio of the common branch arm 2 in accord with the temperature conditions of the actual submarine cable repeater. The simulated repeater 37 is similarly adjusted to adjust the resistive-reactive impedance ratio of the third branch arm 3 to that of the common branch arm 2 including the reference simulated repeater 17. If the adjustment of the simulated repeater 37 is insufficient to obtain the desired impedance ratio in the third branch arm 3, the adjustable capacitor 30 is readjusted to achieve the desired resistive-reactive impedance ratio. If desired, the simulated repeaters 17 and 37 may be matched to each other independently of the adjustable capacitors 10 and 30 by opening the switch 18 and plugging the simulated repeater 37 directly into the receptacle terminals 33 and 34.

One suitable equivalent circuit to simulate the capacitance of a repeater, as indicated above, is shown in simplified form in FIG. 2. This four-element network comprising resistors and capacitors is designed to approximate the signal transmission characteristics of the capacitance of a repeater at very low frequencies (approximately 1 Hz.). The capacitors of the simulated repeaters have a limited range of adjustment to compensate for the influence of environmental temperature conditions on the capacitance of submarine cable repeaters. It is to be understood that the nature and design of the simulated repeaters disclosed herein is in no way intended to limit the scope of the invention.

The impedance ratio balance of the three branch arms 1, 2, and 3 is simultaneously monitored by an oscilloscope 85. The display tube of the oscilloscope 85 preferably has a long persistence phosphor. The vertical deflection terminals of the oscilloscope 85 are connected, via the leads

86 and 87 which traverse the amplifier 66, to the nodal points 15 and 25. Hence the composite signal response of the energized calibration and adjustment networks is applied to the vertical deflection terminals of the oscilloscope 85.

The calibration and adjustment networks are energized by signals displaced in phase by 90° with respect to each other, as described below. The horizontal sweep of the oscilloscope 85 is controlled to sweep in a fixed phase relationship with the energizing signals. The successive horizontal traces on the oscilloscope represent the complex voltage between the nodal points 15 and 25 resulting from the signal response of the calibration and adjustment networks during the successive half cycles of the energizing signals applied to the calibration network and the successive half cycles of the energizing signals applied to the adjustment network. When the area inclosed by successive horizontal traces on the display tube is at a minimum, the three branch arms 1, 2, and 3 have almost identical resistive-reactive impedance ratios.

The adjustment network and the calibration networks are each energized by a unipolar alternating signal whose waveform approximates that of a sine wave. These energizing signals are applied to the adjustment and calibration networks in phase quadrature or 90° out of phase with each other and are derived from the voltage source 50. The voltage of the voltage source 50 is applied, via the lead pairs 51 and 52, to the energy transfer circuits 55 and 65, respectively, which generate the desired energizing signal waveforms and apply these energizing signals to the adjustment and calibration networks.

The energy transfer circuit 55 comprises an energy storage capacitor 56 and an energy transfer capacitor 57. The charge transfer arrangement of the two capacitors 56 and 57 is controlled by a relay 58. The relay 58 controls a switching path, as described below, which facilitates the transfer of charge from the voltage source 50 to the energy storage capacitor 56 and from thence to the energy transfer capacitor 57. The resistors 71 and 72 control the rise times of the voltage being transferred from the energy storage capacitor 56 to the energy transfer capacitor 57 and the calibration network. The fall time of the voltage of the energy transfer capacitor 57 and the calibration network is similarly controlled by the resistors 71 and 72 when the relay 58 releases thereby shunting the capacitor 57 and the calibration network with the capacitance discharge path 59.

The energy transfer capacitor 57 is connected to the branch arms 1 and 2 of the calibration network, via the nodal points 12 and 22. The rise and fall times of the voltage are preferably constrained to approximate the smooth rise and fall of a sine wave. The periodic wave generated by the energy transfer circuits is unipolar (that is the signal voltage does not change polarity) to simulate the actual operating conditions of the submarine cable and its included repeaters.

The charge transfer arrangement of the energy transfer circuit 55 includes the relay armatures 60, 61, 62, and 63 which switch in unison in response to the operation of the relay 58. The relay armatures 60, 61, 62, and 63 of the energy transfer circuit 55 are illustrated in their released condition. In this released condition, the voltage source 50 charges the energy storage capacitor 55 up to the source voltage level, via the lead pair 51 and the connected relay armature 60 and 61. Additionally, in this condition, the relay armatures 62 and 63 are connected to a capacitance discharge path 59 which de-energizes the energy transfer capacitor 57 and the connected calibration network, via the resistors 71 and 72.

When the relay 58 is operated in response to the relay control apparatus 75, described hereinbelow, the relay armatures 60, 61, 62, and 63 change position and connect to the opposite contacts. In response to these operated connections, the charge accumulated in the energy storage capacitor 56 is transferred, via the charge transfer path 64, and the resistors 71 and 72 to the energy transfer capacitor 57 and from thence to the nodal points 12 and 22 of the calibration network. The energy transfer capacitor 57 and the resistors 71 and 72 by controlling the rise and fall time of the energy applied to the nodal points 12 and 22, constrains the voltage waveform of the energizing signal to approximate a sine waveform and additionally attenuates the higher order harmonics of the energizing signal.

Upon the release of the relay 58, the charge retained by the energy transfer capacitor 57 is discharged, via the discharge path 59. The energy storage capacitor 56, now reconnected to the voltage source 50, is again recharged to the voltage level of the voltage source 50. It will be apparent to those skilled in the art that the energy transfer circuit 55 effectively isolates the voltage source 50 from the calibration network. Hence it is unnecessary to balance the source 50 and the calibration network with respect to each other or ground.

The energy transfer circuit 65 is identical to the energy transfer circuit 55, and it is not believed necessary to describe its operation. The relay 68 is shown in its operated condition. The energy transfer circuit 65 energizes the adjustment network by applying a unipolar alternating energizing signal approximating a sine wave to the nodal points 12 and 32 of the adjustment network.

The relays 58 and 68 are energized in phase quadrature or 90° out of phase by the relay control apparatus 75. The relay control apparatus 75 comprises a rotating shaft 80 rotating at a constant rotational velocity and including three cams 77, 78, and 79 affixed to the shaft. The cams 77 and 78 control the energization of the relays 58 and 68, respectively. The energization of the relays 58 and 68 is achieved by periodically closing the switching connections of the switch arms 81 and 82 in response to the lifting action of the cams 77 and 78, respectively. The closure of the switch arms 81 and 82 with the contacts 84 and 83 enables the application of energizing signals from the alternating voltage source 76 to the relays 58 and 68, respectively. The cams 77 and 78 have identical surface contours and are positioned on the shaft 80 so that the respective contours are rotated 90° apart or in phase quadrature to each other. The shaft is driven by a motor 90 which is energized by the alternating voltage source 76.

As illustrated in FIG. 1, the cam 78 has activated the switch arm 82 to connect with its associated contact 83. This connection permits the application of the signal output of the alternating voltage source 76 to the relay 68 which as illustrated is operated. The switch arm 81 rests upon the low portion of the contour of the cam 77 and thus the relay 58 is not energized at this particular angular position of the shaft 80. It will be apparent to those skilled in the art that, as the shaft 80 continues to rotate, the relay 58 will be operated and released 90° subsequent to the corresponding operation and release of the relay 68.

The horizontal sweep of the oscilloscope is energized by recurrent sweep voltage pulses derived from the constant current source 88. These sweep voltage pulses have a linear rise time which approximates a typical ramp function waveform. The constant current source 88 alternately charges the two sweep pulse generating capacitors 69 and 89 sequentially. The two sweep pulse generating capacitors 69 and 89 are energized in response to the alternate switching of the switch arm 91 which is engaged by the cam 79. While cam 79 is shown to be in phase with cam 77, it is to be understood that it could be placed equally well in phase with cam 78 in accord with the invention. The cam 79 alternately connects the switch arm 91 to the switch contacts 92 and 93 to permit the alternate discharge of the capacitors 69 and 89. As one of the capacitors is being discharged, the other capacitor is accumulating a charge at a uniform rate supplied by the constant current source 88, thereby causing the voltage on this capacitor to increase at a uniform rate. This uniformly increasing voltage is applied to the oscilloscope 85, via a smoothing filter comprising the resistor 94 and the capacitor 95. The smoothing filter eliminates transients and interference signals from the sweep voltage waveform. The resistor 67 is included in the discharge path of the capacitors 69 and 89 to limit the current flow through the switch contacts 92 and 93.

Because a common control shaft 80 is utilized to rotate the cams controlling both the horizontal and vertical sweep signals of the oscilloscope 85, the resultant horizontal sweep and vertical deflection signals are applied to the oscilloscope 85 synchronously. The composite signal traces resulting from the phase quadrature excitation of the calibration and adjustment networks are then displayed on the oscilloscope display tube from fixed loci therein. The signal traces due to successive sweep signals are of opposite polarity due to the successive charging and discharging of the energy transfer capacitors of the energy transfer circuits 55 and 65. Hence, the successive traces of the combined signal response of the calibration and adjustment networks enclose an area. The enclosed area vanishes when the three branch arms 1, 2, and 3 have identical impedance ratios. The minimization of the area enclosed by the signal traces is an indication of the near equality of the resistive-reactive impedance ratios established in the three branch arms.

While the aforedescribed impedance adjustment apparatus has been described with reference to the capacitance adjustment of an artificial cable, it is to be understood that the scope of the invention may be readily extended to other applications of measurement and adjustment without departing from the spirit and scope of the invention.

What is claimed is:

1. Test apparatus to adjust the capacitance of an artificial cable to predetermined capacitance values, comprising in combination, a first resistive-reactive variable impedance ratio branch arm including a precision capacitor and a calibrated adjustable resistor, a second resistive-reactive variable impedance ratio branch arm including a first precision resistor and an adjustable capacitor, said first and second branch arms being connected in parallel to form a calibration network, a third branch arm including a second precision resistor and including receptacle means to accept an artificial cable capacitor to be adjusted, said second and third branch arms being connected in parallel to form an adjustment network, an artificial cable capacitor inserted in said receptacle means, means to energize said calibration and adjustment networks in phase quadrature, and means to compare the resistive-reactive impedance ratios of said first, second and third branch arms, whereby said adjustable resistor in said first variable impedance ratio branch arm is adjusted to some value calibrated in terms of a desired capacitance to which said adjustable capacitor in said second variable impedance ratio branch arm is adjusted to achieve the same resistive-reactive impedance ratio as is preset in said first branch arm, and the capacitance of said artificial cable capacitor in said third branch arm is adjusted to achieve a resistive-reactive impedance ratio matching that of the first and second variable impedance ratio branch arms.

2. Test apparatus to adjust the capacitance of an artificial cable as defined in claim 1 further including means to insert a simulated repeater network in said second branch arm in parallel with said adjustable capacitor, auxiliary receptacle means in said third branch arm to accept an artificial cable simulated repeater in parallel with the artificial cable capacitor, means to disconnect said first branch arm from said parallel connection of said first, second, and third branch arms, and means to energize said second and third branch arms with one of the phases of energizing signals supplied by said means to energize.

3. Test apparatus to adjust an artificial cable capacitance as defined in claim 2 wherein two auxiliary adjustable capacitors are shunted across said precision capacitor in said first branch arm to permit minor variations in the resistive-reactive impedance ratio in said first branch arm representng certain predetermined capacitance related variable parameters.

4. The method of adjusting an artificial cable capacitance to simulate the distributed capacitance of a specific section of a transmission cable, comprising the steps of, connecting a variable resistor in a first series circuit including a precision capacitor, adjusting the variable resistor to establish a resistive-reactive impedance ratio with the precision capacitor calibrated in terms of the transmission cable distributed capacitance to be simulated, connecting a variable capacitor in a second series circuit including a first precision resistor, connecting said second series circuit in parallel with said first series crcuit, adjusting the variable capacitor to establish a resistive-reactive impedance ratio with the first precision resistor which ratio is equal to the impedance ratio established in said first series circuit by said adjustment of said variable resistor, connecting the capacitor of the artificial cable in a third series circuit including a second precision resistor, said second precision resistor having a resistance equal to that of said first precision resistor, connecting said third series circuit in parallel with said first and second series circuits, energizing said first and second series circuits with a first unipolar signal, energizing said second and third series circuits with a second unipolar signal in phase quadrature with said first unipolar signal, utilizing the signal response of said first, second, and third series circuits to said first and second unipolar signals to compare their respective resistive-reactive impedance ratios, and adjusting the artificial cable capacitor to establish a resistive-reactive impedance ratio with the third precision resistor which ratio equals the resistive-reactive impedance ratio established in said first and second series circuits.

5. The method of adjusting an artificial cable capacitance to simulate the distributed capacitance of a specific section of a transmission cable as defined in claim 4 further including the steps of, disconnecting said first series circuit from said second and third series circuits, inserting a reference simulated repeater in parallel with said variable capacitor of said second series circuit, inserting an adjustable simulated repeater in parallel with said artificial cable capacitor, and adjusting the impedance of said adjustable simulated repeater to establish a resistive-reactive impedance ratio in said third series circuit identical to the resistive-reactive impedance ratio of said second series circuit including said reference simulated repeater.

6. The method of adjusting an artificial cable capacitance to simulate the distributed capacitance of a specific section of a transmission cable as defined in claim 5 wherein each of said unipolar signals is derived by charging a storage capacitor with a voltage source to a predetermined voltage level, transferring the stored charge via a discharged transfer capacitor to two of said series circuits, wherein said voltage source is isolated from said first, second, and third series circuits.

7. An impedance adjustment apparatus comprising in combination a calibration network to preset a reference capacitance in accord with the environmental conditions of the capacitance it is desired to duplicate, including an adjustable resistor calibrated in terms of these environmental conditions and connected to a precision capacitor permitting the setting of a resistive-reactive impedance ratio, said calibration network further including an adjustable capacitor connected to a precision resistor whereby said adjustable capacitor is adjusted to set a resistive-reactive impedance ratio matching the resistive-reactive impedance ratio previously set with said adjustable resistor, and an adjustment network including means to accept a capacitor to be adjusted whereby said capacitor to be adjusted is connected to a precision resistor and said capacitor is adjusted to set a resistive-reactive impedance ratio equalling the resistive-reactive impedance ratios established in said calibration network, said adjustment network being connected in parallel to said calibration network to facilitate the comparison of the resistive-reactive impedance ratios.

8. An impedance adjustment apparatus as defined in claim 7 further including means to excite said calibration and adjustment networks in phase quadrature, said means to excite comprising a source of potential, a first energy transfer means interconnecting said potential source and said calibration network, a second energy transfer means interconnecting said potential source and said adjustment network, said first and second energy transfer means each including an energy storage capacitor, an energy transfer capacitor and charge transfer switching means, said switching means including means to store charge in said energy storage capacitor, means to discharge said energy transfer capacitor, and means to subsequently transfer the stored charge in said energy storage capacitor to said energy transfer capacitor which in turn excites the calibration and adjustment networks to which it is respectively connected, whereby said switching means of said first and second energy transfer means are activated in phase quadrature to each other.

References Cited

UNITED STATES PATENTS

| | | | |
|---|---|---|---|
| 1,176,559 | 3/1916 | Hoxie | 324—60 |
| 1,695,000 | 12/1928 | Wolff | 179—175.3 |
| 2,493,800 | 1/1950 | Biskeborn | 179—175.3 |
| 2,678,422 | 5/1954 | Broomell et al. | 324—99 |

KATHLEEN H. CLAFFY, Primary Examiner

A. B. KIMBALL, JR., Assistant Examiner

U.S. Cl. X.R.

178—69; 324—57